United States Patent
Gruen et al.

(10) Patent No.: US 10,544,235 B2
(45) Date of Patent: Jan. 28, 2020

(54) ALDIMINES AND KETIMINES AS INITIATORS IN HARDENER SYSTEMS AND CORRESPONDING RESIN COMPOSITIONS INTER ALIA FOR FIXING TECHNOLOGY

(71) Applicant: fischerwerke GmbH & Co. KG, Waldachtal (DE)

(72) Inventors: Juergen Gruen, Boetzingen (DE); Paul Steurer, Teningen (DE); Martin Vogel, Glottertal (DE); Christian Schlenk, Denzlingen (DE); Christian Weinelt, Teningen (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 117 days.

(21) Appl. No.: 15/738,092

(22) PCT Filed: Jun. 3, 2016

(86) PCT No.: PCT/EP2016/000927
§ 371 (c)(1),
(2) Date: Dec. 19, 2017

(87) PCT Pub. No.: WO2016/206777
PCT Pub. Date: Dec. 29, 2016

(65) Prior Publication Data
US 2018/0179304 A1    Jun. 28, 2018

(30) Foreign Application Priority Data

Jun. 26, 2015   (DE) .................. 10 2015 110 283

(51) Int. Cl.
| | |
|---|---|
| *C08F 4/26* | (2006.01) |
| *C08F 4/10* | (2006.01) |
| *C08F 4/20* | (2006.01) |
| *C04B 41/48* | (2006.01) |
| *C09D 4/00* | (2006.01) |
| *C09J 4/00* | (2006.01) |
| *C09J 5/00* | (2006.01) |

(52) U.S. Cl.
CPC .............. *C08F 4/26* (2013.01); *C04B 41/483* (2013.01); *C08F 4/10* (2013.01); *C08F 4/20* (2013.01); *C09D 4/00* (2013.01); *C09J 4/00* (2013.01); *C09J 5/00* (2013.01); *C09J 2400/263* (2013.01); *C09J 2433/00* (2013.01)

(58) Field of Classification Search
CPC ..... C04F 4/26; C09D 4/00; C08F 4/10; C08F 4/20; C09J 2433/00; C09J 5/00; C09J 2400/263; C09J 4/00; C04B 41/483
USPC ....................................................... 524/850
See application file for complete search history.

(56) References Cited

U.S. PATENT DOCUMENTS

| | | | |
|---|---|---|---|
| 3,492,269 A | 1/1970 | Janssen | |
| 4,130,511 A | 12/1978 | Andrews | |
| 4,148,950 A | 4/1979 | Brindell | |
| 4,348,506 A * | 9/1982 | Ganguli | ............. C08F 299/026 525/512 |
| 4,391,958 A | 7/1983 | Minato | |
| 4,518,283 A | 5/1985 | Gebauer | |
| 5,011,994 A | 4/1991 | Bartels | |
| 5,032,629 A | 7/1991 | Hansen | |
| 5,531,546 A | 7/1996 | Herdlicka | |
| 5,854,305 A | 12/1998 | Schwiegk | |
| 6,207,733 B1 | 3/2001 | Feola | |
| 6,664,350 B1 * | 12/2003 | Haddleton | ............... C08F 4/02 502/152 |
| 6,828,405 B1 * | 12/2004 | Cai | ......................... C08G 18/10 528/61 |
| 2002/0091214 A1 | 7/2002 | Waanders | |
| 2004/0092656 A1 | 5/2004 | Vogel | |
| 2006/0149025 A1 | 7/2006 | Burckhardt | |
| 2006/0223943 A1 | 10/2006 | Sakamoto et al. | |
| 2007/0151666 A1 | 7/2007 | Moeller | |
| 2008/0171807 A1 | 7/2008 | Kumru | |
| 2010/0101455 A1 | 4/2010 | Burckhardt | |
| 2011/0071251 A1 * | 3/2011 | Dana | ................... C08F 293/005 524/558 |
| 2012/0220736 A1 | 8/2012 | Burckhardt | |

(Continued)

FOREIGN PATENT DOCUMENTS

| | | |
|---|---|---|
| DE | 27 22 033 A1 | 12/1977 |
| DE | 3 226 602 A1 | 1/1984 |

(Continued)

OTHER PUBLICATIONS

International Search Report and Written Opinion for corresponding International Application No. PCT/EP2016/000927 dated Jul. 28, 2016.
Search Report for related German Application No. 10 2015 110 284.6, dated Jan. 29, 2016.
Search Report for related German Application No. 10 2015 118 135.5, dated Apr. 29, 2016.
International Preliminary Report on Patentability for corresponding International Application No. PCT/EP2016/000927 dated Jan. 4, 2018.

(Continued)

*Primary Examiner* — Hui H Chin
(74) *Attorney, Agent, or Firm* — Renner, Otto, Boisselle & Sklar, LLP

(57) ABSTRACT

A hardener system for a synthetic resin composition having free-radical-polymerisable compounds, which includes the following constituents: a) at least one activator in the form of a metal salt, and as free-radical starter b1) (i) at least one aldehyde and/or ketone and at least one primary amine, and/or b2) (ii) at least one aldimine or (iii) at least one ketimine, or a mixture of two or more of constituents (i) to (iii). In addition, synthetic resin compositions having such a hardener system for application especially in fixing technology, and subject matters related thereto.

22 Claims, No Drawings

(56) References Cited

U.S. PATENT DOCUMENTS

| | | | |
|---|---|---|---|
| 2015/0087795 A1* | 3/2015 | Matyjaszewski | B01J 31/2295 526/172 |
| 2016/0060493 A1 | 3/2016 | Grun | |
| 2016/0168286 A1* | 6/2016 | Pfeil | C08F 4/40 524/559 |

FOREIGN PATENT DOCUMENTS

| | | |
|---|---|---|
| DE | 39 40 309 A1 | 6/1991 |
| DE | 4111828 A1 | 10/1992 |
| DE | 195 31 649 A1 | 3/1997 |
| DE | 196 28 309 A1 | 1/1998 |
| DE | 199 56 509 | 1/2001 |
| DE | 10 2004 035 542 A1 | 2/2006 |
| DE | 10 2014 103 923 A1 | 10/2014 |
| EP | 0 240 083 A2 | 10/1987 |
| EP | 0 387 418 A2 | 9/1990 |
| EP | 0 957 121 A2 | 11/1999 |
| EP | 1 329 469 A1 | 7/2003 |
| EP | 1 586 569 A1 | 10/2005 |
| EP | 1 935 860 A1 | 6/2008 |
| EP | 1 975 190 A1 | 10/2008 |
| EP | 2 017 260 | 1/2009 |
| EP | 2 824 117 A1 | 1/2015 |
| WO | WO 92/18575 A1 | 10/1992 |
| WO | WO 99/28352 A1 | 6/1999 |
| WO | WO 02/079293 | 10/2002 |
| WO | WO 02/079341 | 10/2002 |
| WO | WO 2007/042199 | 4/2007 |
| WO | WO 2009/137929 A1 | 11/2009 |
| WO | WO 2013/126745 A2 | 8/2013 |

OTHER PUBLICATIONS

Office Action for corresponding Chinese patent Application No. 201680036780.2 dated Jun. 17, 2019.

* cited by examiner

ALDIMINES AND KETIMINES AS INITIATORS IN HARDENER SYSTEMS AND CORRESPONDING RESIN COMPOSITIONS INTER ALIA FOR FIXING TECHNOLOGY

TECHNICAL FIELD

The invention relates to a hardener system, comprising (i) at least one aldehyde and/or ketone and at least one primary amine, (ii) at least one aldimine or (iii) at least one ketimine, or a mixture of two or more of the constituents (i) to (iii), and at least one activator (accelerator) in the form of a metal salt as initiator system for a synthetic resin composition that includes free-radical-polymerisable compounds, preferably suitable or adapted for use or for processes in chemical fixing technology; to a synthetic resin composition that includes such a hardener system, to the use of the hardener system or the synthetic resin composition, especially in the fixings field, and to associated further subject matters of the invention, such as processes, methods and uses.

DISCUSSION OF RELATED ART

Synthetic resin compositions based on free-radical-polymerisable (hardenable) compounds, such as unsaturated polyester resins and vinyl ester resins, are known as adhesives and bonding agents. They are often two-component systems in which the synthetic resin mixture and the hardening agent are each contained in a separate component. In order to harden such synthetic resin compositions (especially those hardenable at ambient temperature), so-called free-radical starters (initiators) are required. In chemical fixing technology, two initiator systems have become established by virtue of their properties. DE 3 226 602 A1 describes an initiator system which comprises benzoyl peroxide as initiator and an amine compound as accelerator. EP 1 586 569 A1, on the other hand, proposes a system based on a perester as free-radical starter and a metal compound as activator.

A disadvantage of those known initiator systems, however, is the use of peroxides as free-radical starter. They are thermally sensitive and react sensitively to impurities, with the result that the formulation of paste-form hardener compositions is subject to considerable limitations in respect of storage temperature, storage stabilities and the choice of suitable constituents. To stabilise peroxides it is necessary to add stabilising agents, such as phthalates or water. Acting as plasticisers, the latter significantly impair the mechanical strength of the synthetic resin compositions.

Also on ecological grounds and because in many countries peroxides have to be labelled as sensitising above a certain concentration (for example in the case of dibenzoyl peroxide in concentrations of 1% and above), it is desirable to avoid such initiators. Similar concerns also apply to amine accelerators, some of which likewise require hazard labelling.

Aldimines and ketimines (also referred to below collectively as imines, which denotes "ketimine or preferably aldimine") are condensation products of primary amines and aldehydes and ketones, respectively. On contact with water, such imines can be hydrolysed to the corresponding amines and aldehydes and ketones, respectively. For that reason they can be used as a protected form of amines, and of aldehydes or ketones. For example, aldimines are often used in polyurethane chemistry or epoxide chemistry, where they serve as moisture-activatable crosslinkers ("blocked amines" or "latent hardeners") for compositions having isocyanate groups or epoxy groups and thus bring about curing in accordance with the polyaddition principle. Examples of such applications are found in EP 1 329 469 A1, EP 1 975 190 A1 and EP 2 017 260.

Imines in free-radical hardenable synthetic resin compositions are mentioned in U.S. Pat. No. 4,348,506. In that specification vinyl ester resins are hardened with peroxides, more especially ketone peroxide, as initiator and a) with a cobalt-aldimine complex and/or b) with a cobalt naphthenate and an equivalent amount of aldimine as accelerator. An "active" use of imines as actual free-radical starter (without peroxides)—in combination with metal activators—for free-radical polymerisations is not mentioned therein and not known hitherto.

EP 2 824 117 A1 describes the use of copper(II) salts and nitrogen-containing ligands as a peroxide-free initiator system for free-radical-polymerisable compounds. The nitrogen-containing ligands are preferably tertiary aliphatic amines with readily removable hydrogen atoms at the carbon atom in the α-position to the nitrogen. As examples, EP 2 824 117 A1 mentions inter alia N,N,N',N'',N''-pentamethyldiethylenetriamine (PMDETA) and the higher and lower homologues thereof. A disadvantage of reactive resin compositions according to EP 2 824 117 A1 is that they allow only low strengths or bond stresses and in some cases are classified as harmful (PMDETA is labelled with a skull and crossbones).

The problem was accordingly to provide new hardener and resin compositions which overcome the disadvantages described in the prior art, but retain or surpass any existing advantages thereof (for example low-temperature hardening, robust mixing ratios between resin and hardener) and possibly exhibit further advantages; and provide suitable strengths and the ability to be used for the purposes mentioned at the beginning without relying on peroxides as initiators.

SUMMARY OF THE INVENTION

It has now been found, surprisingly, that (i) aldehydes and/or ketones together with primary amines, (ii) aldimines and (iii) ketimines in combination with metal salts can be employed as initiator systems for synthetic resin compositions that include free-radical-polymerisable (hardenable) compounds.

It has been found, moreover, that the imines suitable for use according to the invention, which—unlike the nitrogen-containing ligands of EP 2 824 117 A1—contain an $sp^2$-hybridised nitrogen atom, result in particularly effective hardener systems. This is manifested not only in the improved strengths and bond stresses but also in a wider choice of possible metal salts for use as accelerator, which is not limited to copper only.

DETAILED DESCRIPTION OF THE INVENTION

Against this background, in a first embodiment of the invention the invention relates to a hardener system for a synthetic resin composition having free-radical-polymerisable compounds, which hardener system includes the following constituents:
  a) at least one activator in the form of a metal salt, and as free-radical starter
  b1) at least one aldehyde and/or ketone and at least one primary amine, and/or b2) at least one imine which includes one or more imine structural increments of the formula (I):

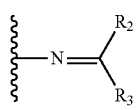

(I)

wherein independently of one another:
the wavy line represents the organic radical of the (particular) amine used, or denotes hydrogen; and
$R_2$ and $R_3$ each independently of the other denotes hydrogen and/or an unsubstituted or substituted, optionally double-bond- and/or hetero-atom-containing singly or multiply branched or straight-chain organic radical which includes at least one aliphatic, heteroaliphatic, alicyclic or heterocyclic molecular structure, or a combination of two or more of the afore-mentioned molecular structures; and/or salts thereof.

Preferably the molecular weight of the imines that include imine structural increments of the formula I is 2000 Dalton (g/mol) or lower, for example 1000 Dalton or lower. The aldehydes and/or ketones also preferably each have molecular weights in those ranges.

The said hardener system can be in the form of a finished hardener composition (for example with microencapsulated constituents a) and b)) or preferably is formed only on mixing with further constituents of a synthetic resin composition (to some extent as a composition (mixture)), for example on use.

A further form of implementation of the invention which should be given special emphasis relates to the use of such a hardener system as initiator system for a synthetic resin composition that includes free-radical-polymerisable compounds, which composition further includes as constituent
c) at least one free-radical-polymerisable compound.

The synthetic resin composition that includes free-radical-polymerisable compounds is used especially as an adhesive, coating material or moulding composition, especially for the fixing of anchoring means in substrates, such as masonry or concrete, or furthermore for the fixing of fibres, non-crimp fabrics, woven fabrics or composites for reinforcing built structures, so that especially the (further) use of the hardener system takes place preferably as a constituent of such a synthetic resin composition as specified below for the mentioned purposes.

A further form of implementation relates to a synthetic resin composition, including the constituents:
a) at least one activator in the form of a metal salt, and as free-radical starter
b1) at least one aldehyde and/or ketone and at least one primary amine, and/or
b2) at least one imine which includes at least one imine structural increment of the formula (I) shown above; and
c) at least one free-radical-polymerisable compound.

Preferably, in synthetic resin compositions according to the invention the ratio of the molar amounts (n) of double bonds to carbonyl (aldehyde or keto groups) or imino groups (n (C=C):n (N=C) or n (O=C)) is 4000:1 to 1:10, especially 3000:1 to 1:2.

The ratio of the molar amounts (n) of carbonyl (aldehyde or keto groups) or imino groups to metal is preferably n (N=C) or n (O=C):n (Me)=1000:1 to 1:50, especially from 500:1 to 1:10.

In a further form of implementation, the invention relates also to the use of a synthetic resin composition, having the composition as just described or as described below, as an adhesive, coating material or moulding composition, especially in the fixings field or fixings sector, in this case primarily for the fixing of anchoring means in (building) substrates, such as masonry or concrete, or for the fixing of fibres, non-crimp fabrics, woven fabrics or composites for reinforcing built structures. Use is effected especially in the form of a multi-component kit, such as a two-component kit, so that the reactive constituents are able to come into contact and react with one another only at the site of use.

A further form of implementation of the invention relates to corresponding processes or methods particularly for the fixing of anchoring elements (anchoring means) in holes or crevices, in which a single-component or multi-component synthetic resin composition according to the invention is used for mortared installation (adhesive installation) of anchoring means, the synthetic resin composition and an anchoring means being introduced in succession, especially first the synthetic resin composition, then the anchoring means, or (at least substantially) simultaneously into a hole or a crevice in a substrate (including in a cracked substrate, such as cracked concrete), or mixed forms of those two variants with partial introduction in each case.

A further form of implementation of the invention relates to corresponding processes or methods for the fixing of fibres, non-crimp fabrics, woven fabrics or composites for reinforcing built structures, in which the single-component or multi-component synthetic resin compositions according to the invention are used as fixing means (adhesives).

Forms of implementation of the invention will also be found in the claims, which are incorporated herein by reference, the subsidiary claims representing preferred embodiments of the invention. The Examples also relate to preferred forms of implementation.

Hereinbefore and hereinbelow, in the case of more general terms or features it is possible for one, some or all of such terms or features to be replaced in each case by definitions more specifically mentioned (especially hereinbelow), resulting in specific, preferred forms of implementation of the invention.

Where "a" or "an" is used, then (unless otherwise apparent, for example from having "at least" before it) this is to be understood as being primarily the indefinite article and includes "one (in figures: 1) or more" as well as only one (in figures: 1). In other words, "a" or "an" means "one or more, for example two or three or four". "At least one" denotes one or more. Where the plural is used (for example "double bonds", "hetero atoms", etc.), this also includes the singular ("double bond", "hetero atom", etc.).

Hereinbefore and hereinbelow, proportions or contents given in percent are in each case percent by weight ("% by weight") or the relative proportion by weight, unless otherwise specified, based on all ingredients of a resin composition according to the invention (without packaging material), unless otherwise indicated or apparent.

"Include" or "comprise" means that other constituents or components or features may be present in addition to those mentioned and therefore does not denote an exhaustive list, unlike "consist of" the use of which does signify an exhaustive list of constituents/-components/features. Preferably "consist of" can be used instead of "include", especially in connection with the term "molecular structure(s)".

Where the attribute "furthermore" is mentioned, this means that greater preference is given to features without that attribute.

"And/or" means that the mentioned features/substances can in each case be present on their own or in a combination of two or more of the particular features/substances mentioned.

"Resin composition" is to be understood as being a synthetic resin composition, but for the sake of brevity the term "resin composition" is largely used.

Where "(meth)acrylates" or "-(meth)acrylates" are mentioned, this denotes acrylates, methacrylates or mixtures thereof.

Alkyl (also in alkylene or alkyloxy) and/or aliphatic denotes preferably an unbranched or singly or multiply branched—optionally unsaturated—hydrocarbon chain having, for example, 12 carbon atoms.

Cycloalkyl (also in cycloalkylene) and/or (ali)cyclic denotes preferably a cycloaliphatic radical having from 3 to 18 carbon atoms, for example having from 3 to 8 carbon atoms, in the ring.

Aryl (also in arylene) and/or aromatic denotes especially aryl having from 6 to 22 carbon atoms, for example having from 6 to 10 carbon atoms, especially phenyl (or phenylene).

The prefix "hetero-" preferably means that one or more carbon atoms independently of one another have been replaced by hetero atoms, for example by from 1 to 3 hetero atoms (for example selected from O, N, such as NH or N-alkyl, S and Si).

Aliphatic-aromatic denotes especially an arylalkyl, arylalkylene, arylenealkyl or alkyl-arylenealkyl radical with aryl, alkyl, alkylene and arylene as just defined.

Where reference is made to "substituted" or "substituent", this denotes an atom or a group of atoms (for example hydroxy) which replaces a hydrogen atom in a molecule. The substituent and/or substituents (in the case of "substituted") can be located along the main chain and/or in the case of branches along the side chain. Radicals, increments or molecular structures so characterised can preferably be saturated or unsubstituted.

In all forms of implementation of the invention there is preferably no addition (admixture) whatever of initiators from the prior art, especially peroxides as such, azides, azo compounds and photoinitiators as free-radical starter, that is to say the subject matters of the invention do without such compounds (they are free thereof), it not being excluded that in isolated cases peroxides may be formed incidentally during storage or during reaction (for example also as a result of reaction with atmospheric oxygen), but there is no active addition "from outside".

"Initiators" from the prior art are free-radical starters, as mentioned. Examples of such peroxides are alkyl hydroperoxides, dialkyl peroxides, peracetals, perketals, peracids, aldehyde peroxides and ketone peroxides; peroxycarbonates, peroxy esters, diacyl peroxides, and the like, for example as mentioned in WO 2007/042199 and US 2002/0091214. Examples of non-peroxidic compounds are azo compounds such as AIBN and tetrazenes.

The aldehydes, ketones, amines, aldimines or ketimines used or included according to the invention are known or can be produced/are obtainable in accordance with processes known per se and are preferably obtained in accordance with those processes. The imines can be synthesised or obtained prior to use (for example for fixing anchoring elements) or only "in situ". Possible processes according to the invention are therefore (t) separate prior production and/or (tt) "in situ" production in which the aldehyde/ketone and the primary amine are divided between different components of the fixing system and are mixed together, for example at the site of use, and/or (ttt) "in situ" production in a component of the fixing system in which the aldehyde/ketone and the primary amine are mixed together during the preparation of the component in question. In particular, the imines according to (t) are obtained by condensation, with removal of water, from one or more amines with one or more aldehydes or ketones. Appropriate reaction conditions for separate prior reaction (t) are known to the person skilled in the art.

Examples of suitable amines and aldehydes or ketones can be found especially in DE 10 2004 035 542 A1, EP 1 329 469 A1, EP 1 975 190 A1 and EP 2 017 260, which are incorporated herein by reference in respect of the amines, aldehydes, ketones, aldimines and ketimines mentioned generally and specifically therein.

The primary amines added as such or suitable for synthesis of the imines comprise, for example, mono-, di- or poly-amines, or mixtures of two or more thereof. The mono-, di- and/or poly-amines that are suitable for use can be both linear and branched. The molecular structure of the mono- and/or di- and/or poly-amines can contain aliphatic, heteroaliphatic, alicyclic, heterocyclic, aromatic, aliphatic-aromatic and silane/siloxane molecular structures or two or more thereof selected independently. Primary and/or secondary and tertiary amino groups can be present in the molecule, but at least one primary amino group (—NH$_2$), for forming the aldimine or ketimine, must be present.

The mono-, di- or poly-amines are preferably selected from the group of alkyl- or alkylene-(mono- or di-)amines (such as, for example: 2-methylpentanediamine, or 2,2,4- or 2,4,4-trimethylhexamethylenediamine), heteroalkyl- or heteroalkylene-(mono- or di-)amines (such as, for example, 1,13-diamino-4,7,10-trioxatridecane, commercially available amine-functionalised polyoxyalkylenes [Jeffamines] from Huntsman Corp, or, for example: triethylenetetramine and/or higher homologues), cycloalkyl- or cycloalkylene-(mono- or di-)amines (such as, for example: isophoronediamine, 1,3-bisaminomethylcyclohexane, TCD-diamine), heterocycloalkyl- or heterocycloalkylene-(mono- or di-) amines (such as, for example: aminoethylpiperazine), aminols or amino alcohols (such as, for example, 1,3-diaminopropan-2-ol), and aliphatic-aromatic (mono- or di-)amines (such as 1,3- or 1,4-benzenedimethanamine), and/or from the group of aminosilanised fillers.

With further preference, the mono-, di- or poly-amines can be selected from the group of aminoamides, polyaminoamides, Mannich bases and amine adducts (epoxy-amine adducts as described, for example, in EP 0 387 418 A2, isocyanate-amine adducts [for example from unreacted amino groups of the imine synthesis or from the above-mentioned aminols—when aminols are used, preferably the reaction to form the imine takes place first, followed by the addition to the isocyanate], Bucherer adducts and Michael addition adducts).

Also of special interest as amines are aminoalkylsilanes which include at least one hydrolysable group, such as alkoxy, for example methoxy or ethoxy—bonded to the silicon. These can (as a result of water of reaction that is formed or added water) hydrolyse and condense and thus form oligomers which carry a plurality of amino groups and fulfil the REACH definition for polymers. Imines from such aminoalkylsilanes therefore form the basis for especially preferred embodiments of the invention. Preferred such aminoalkylsilanes are selected, for example, from the group which comprises one or more of the following compounds: aminoalkyl-tri- or -di-alkoxysilanes, such as 3-aminopropyl-trimethoxysilane or 3-aminopropyl-triethoxysilane, and N-(aminoalkyl)-amino-alkyl-tri- or -di-alkoxysilanes, such as N-(2-aminoethyl)-3-aminopropyl-trimethoxysilane or N-(2-aminoethyl)-3-aminopropyl-methyldimethoxysilane, furthermore ureidoalkyltrimethoxysilanes, such as 3-ureidopropyl-trimethoxysilane.

In a further special form of implementation of the subject matters of the invention there can be provided and included as polyamines amino-silanised fillers that carry primary amino groups, such as aminosilane-treated quartz powder (for example Silbond AST® from Quarzwerke GmbH), aminosilane-treated silica (for example Aktisil AM® from Hoffmann Mineral), or aminosilane-treated pyrogenic silicas.

The aldehydes and ketones added as such or usable or suitable for the synthesis of the aldimines and/or ketimines are especially those of the formula (II):

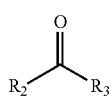

(II)

wherein:
$R_2$, $R_3$ each independently of the other denotes hydrogen and/or an unsubstituted or substituted and/or an optionally double-bond- and/or hetero-atom-containing singly or multiply branched or straight-chain organic radical which may comprise aliphatic, heteroaliphatic, alicyclic or heterocyclic molecular structures and/or combinations of the afore-mentioned molecular structures.

The aldehydes and/or ketones are preferably compounds which have at least one or more (primary and/or secondary) hydrogen atoms at the carbon atom in the α-position to the carbonyl group. Examples of such aldehydes are propanal, valeraldehyde, isovaleraldehyde, or methoxyacetaldehyde, or 3,7-dimethyl-6-octenal (citronellal) or 3,7-dimethyl-7-hydroxy-octanal (hydroxycitronellal). As such ketones there may be mentioned here by way of example also methyl isobutyl ketone, acetone, or methyl ethyl ketone or 6-methyl-5-hepten-2-one.

The aldehydes and/or ketones are especially preferably compounds which have a double bond and/or branch at the carbon atom in the α-position to the carbonyl group. As a result, the especially preferred aldehydes and/or ketones have only one (tertiary) hydrogen atom at the carbon atom in the α-position to the carbonyl group. Examples of especially preferred aldehydes are isobutyraldehyde, 2-ethylhexanal, 2-methylbutanal, 2-ethylbutanal, 2-methylvaleraldehyde, 2,3-dimethylvaleraldehyde, cyclohexylcarboxaldehyde, or 3,7-dimethyl-2,6-octadienal (Citral), 3-(4-tert-butylphenyl)-2-methylpropanal (Lilial, Lysmeral), tetrahydrofuran-3-carboxaldehyde, tetrahydro-2-furancarboxaldehyde, 4-formyltetrahydropyran, tetrahydro-2H-pyran-2-carbaldehyde or tetrahydropyran-3-carbaldehyde. As especially preferred ketones there may be mentioned here by way of example diisopropyl ketone, 3-methyl-2-pentanone, 2-methylcyclohexanone or β-ionones.

The afore-mentioned examples of suitable amines, preferred and especially preferred aldehydes and/or ketones are not intended to limit the scope of suitable amines, aldehydes and/or ketones, but merely illustrate some exemplary compounds having the above-mentioned structural features defined as suitable, preferred and especially preferred.

Special preference is also given to the aldehydes, ketones or synthesised aldimines and/or ketimines mentioned in the Examples and to the specific amines, ketones and aldehydes added as such and/or used for the synthesis of the aldimines and/or ketimines, or mixtures of two or more thereof.

The at least one free-radical-polymerisable compound is a non-aromatic compound that includes unsaturated groups, preferably a free-radical-hardening unsaturated reactive resin with preferably at least 2 or more reactive non-aromatic unsaturated bonds, or a mixture of two or more reactive resins.

As free-radical-hardening reactive resin or synthetic resin there are suitable according to the invention ethylenically unsaturated compounds and compounds having carbon-carbon triple bonds.

Especially suitable is the group of ethylenically unsaturated compounds which comprises styrene and derivatives; vinyl esters, such as (meth)acrylates, urethane (meth)acrylates or itaconates, or epoxy(meth)acrylates; furthermore unsaturated polyesters, vinyl ethers, allyl ethers, dicyclopentadiene compounds and unsaturated fats.

Special preference is given primarily to one or more such reactive resins which comprise (free-radical-)hardenable esters with one or more unsaturated carboxylic acid radicals (as described, for example, in DE 10 2014 103 923 A1); preferably in each case propoxylated or especially ethoxylated aromatic diol-, such as bisphenol-A-, bisphenol-F- or novolak-(especially di-)(meth)acrylates; epoxy(meth)acrylates, especially in the form of reaction products of di- or poly-epoxides, for example bisphenol-A-, bisphenol-F- or novolak-di- and/or -poly-glycidyl ethers, with unsaturated carboxylic acids, for example $C_2$-$C_7$alkene-carboxylic acids, such as especially (meth)acrylic acid; urethane- and/or urea-(meth)acrylates-especially urethane (meth)acrylates which are obtained, for example, by reaction of di- and/or poly-isocyanates (higher functional isocyanates) with suitable (meth)acrylic compounds (such as, for example: hydroxyethyl or hydroxypropyl methacrylate), optionally with the participation of hydroxy compounds that contain at least two hydroxy groups, as described, for example, in DE 39 40 309 A1 and/or DE 4111828 A1; or unsaturated polyester resins, or the like, or two or more of such hardenable unsaturated organic components.

The proportion by weight of that or those reactive resin(s) is preferably in the range of from 0.1 to 90% by weight, for example between 0.5 and 75% by weight or between 1 and 40% by weight or especially from 15 to 60% by weight, for example from 20 to 50% by weight.

Important examples of further ingredients (especially those customary in the fixings field) are co-accelerators, inhibitors, reactive diluents, thixotropic agents, fillers and/or further additives.

As co-accelerators there can come into consideration amine co-accelerators, such as especially (preferably tertiary, especially hydroxyalkylamino-group-substituted) aromatic amines selected from the group which comprises epoxyalkylated anilines, toluidines or xylidines, such as, for example, ethoxylated toluidine, aniline or xylidine, such as N,N-bis(hydroxyethyl)-p-toluidine and very especially also correspondingly higher alkoxylated technical products. Mixtures of two or more co-accelerators, especially of those mentioned, are possible. The co-accelerator(s) have preferably a proportion (concentration) of from 0.005 to 10% by weight, especially from 0.1 to 5% by weight.

As inhibitors there can be added, for example, non-phenolic (anaerobic) and/or phenolic inhibitors.

As phenolic inhibitors (which are provided as a constituent already added to commercial free-radical-hardening reactive resins but, furthermore, may also be absent) there come into consideration (optionally alkylated) hydroquinones, such as hydroquinone, mono-, di- or tri-methyl hydroquinone, (optionally alkylated) phenols, such as 4,4'-methylene-bis(2,6-di-tert-butylphenol), 1,3,5-trimethyl-2,4,6-tris (3,5-di-tert-butyl-4-hydroxybenzyl)-benzene, or 4-methoxyphenol, (optionally alkylated) pyrocatechols such as tert-butyl pyrocatechol or 3,5-di-tert-butyl-1,2-benzenediol, or mixtures of two or more thereof. They are present in a proportion of preferably up to 1% by weight, especially between 0.0001 and 0.5% by weight, for example between 0.01 and 0.1% by weight.

As non-phenolic or anaerobic inhibitors there come into consideration preferably phenothiazines or other stable organic free radicals, such as galvinoxyl and N-oxyl free radicals. As organic nitroxyl free radicals (especially "HALS") there can be provided, for example, those from DE 199 56 509, especially 1-oxyl-2,2,6,6-tetra-methylpiperidin-4-ol ("4-OH-TEMPO" or "TEMPOL"). The proportion by weight of the non-phenolic inhibitors is preferably, based on the reactive resin formulation, in the range of from 1 ppm (by weight) to 2% by weight, especially, for example, in the range of from 10 ppm (based on weight) to 1% by weight.

As thixotropic agents there can be used customary thixotropy-imparting rheology aids, such as pyrogenic silica, bentonites, alkyl and methyl celluloses, castor oil derivatives or the like, for example in a proportion by weight of from 0.01 to 50% by weight, for example from 0.1 to 5% by weight.

Further additives can also be added, such as plasticisers, non-reactive diluents, further silanes, flexibilisers, stabilisers, antistatic agents, thickeners, hardening catalysts, rheology aids, wetting agents and dispersants, colouring additives, such as dyes or especially pigments, for example for staining the components different colours for better monitoring of their intermixing, or the like, or mixtures of two or more thereof. Such additives can be added, for example, in total in proportions by weight of in total from 0 to 90% by weight, for example from 0 to 40% by weight. They can be added to one or more components in the case of multi-component systems in the manner known and apparent to the person skilled in the art.

As reactive diluents for free-radical-hardening reactive resins or synthetic resins there can additionally be added also one or more low-viscosity free-radical-polymerisable compounds, as described, for example, in EP 1 935 860 A1 and DE 195 31 649 A1. Preferably the synthetic resin contains as "reactive diluent" (meth)acrylic acid esters ((meth)acrylates) of the formula $(H_3C \text{ or } H)-C(=CH_2)-C(=O)-OX$, wherein X is an optionally substituted or poly-substituted alkyl radical (including hydroxyalkyl (meth)acrylates, such as (for example 2-)hydroxypropyl (meth)acrylate or hydroxyethyl (meth)acrylate), alkyl (meth)acrylates having from 1 to 10 (meth)acrylate groups, such as mono-, di-, tri-, tetra-, penta-, hexa- or poly-(meth)acrylates, for example alkyl di- or tri-(meth)acrylates, such as 1,2-ethanediol di(meth)acrylate, 1,3- or especially 1,4-butanediol di(meth)acrylate, hexanediol di(meth)-acrylate, diethylglycol di(meth)acrylate, trimethylolpropane tri(meth) acrylate, glycerol tri-(meth)acrylate, polyglycerol poly (meth)acrylate, polyethylene glycol di(meth)acrylate, cycloalkyl-, bicycloalkyl- or heterocycloalkyl-(meth)acrylates, wherein cycloalkyl or bicycloalkyl has from 5 to 7 ring carbon atoms and heterocyclyl has 5 or 6 ring atoms and 1 or 2 ring hetero atoms selected from N, O and S, such as tetrahydrofurfuryl (meth)acrylate or isobornyl (meth)acrylate, or acetoacetoxyalkyl (meth)acrylate. Furthermore it is possible for styrenes, such as styrene, α-methyl styrene, vinyl toluene, tert-butyl styrene and/or divinyl benzene, or mixtures of two or more thereof, to be provided as constituents that cure in parallel with the free-radical-hardening unsaturated reactive resin. The reactive diluent(s) are added, for example, in a proportion by weight of from 0.1 to 90% by weight, for example between 0.5 and 75% by weight or between 1 and 40% by weight.

Activators as constituents used in the form of a metal salt, which also includes metal complexes and metal oxides, are preferably one or more metal salts or especially one or more salts of organic and/or inorganic acids with metals, for example selected from copper, iron, vanadium, manganese, cerium, cobalt, zirconium, or bismuth, or mixtures of two or more thereof. In particular, the metal salts are selected from the group consisting of vanadium, iron, manganese and copper, especially in the form of salts or complexes with inorganic acid radicals, such as sulfate and/or carbonate radicals and/or organic acid radicals, for example carboxylate radicals,—the organic acids preferably being saturated—such as carboxylates with $CH_3$, $C_2$-$C_{20}$alkyl, a $C_6$-$C_{24}$aryl radical or $C_7$-$C_{30}$aralkyl radical, for example octoate, for example 2-ethyl hexanoate (isooctanoate), neodecanoate, or acetyl-acetonate. Special preference is given to manganese carboxylates, such as Mn acetate or Mn octoate, copper carboxylates, such as copper octoate or copper naphthenate, copper quinolates, iron carboxylates, such as iron octoate and/or vanadium carboxylates and/or the group of metal salts with inorganic acids which comprises, for example, iron chloride, iron sulfate, copper sulfate and copper chloride.

Such activators are known or can be produced according to processes known per se and are preferably present in a proportion of from 0.01 to 20% by weight, for example from 0.1 to 5% by weight.

Fillers can be present in one component or, in the case of multi-component compositions, in a plurality of components of a synthetic resin composition according to the invention, for example in the form of a multi-component kit. They are present in a proportion of preferably from 0 to 80% by weight, for example from 5 to 80% by weight, for example from 40 to 70% by weight.

As fillers there are used customary fillers, for example hydraulically hardenable fillers, such as gypsum, calcined chalk, water glasses or especially cements, such as Portland cement or alumina cements; mineral or mineral-like fillers, such as chalks, sand, stone dusts, quartz, glass, porcelain, corundum, ceramics, silicates, clays, barite, aluminium hydroxide or the like, which can be added in the form of powder, in granular form or in the form of shaped bodies, or other fillers, such as, for example, those mentioned in WO 02/079341 and WO 02/079293 (which in this regard are incorporated herein by reference), or mixtures of two or more thereof, it being possible for the fillers furthermore or especially also to have been silanised as already mentioned or in some other way.

As further silanes there come into consideration all monomeric silanes and/or oligomeric siloxanes which contain one or more hydrolysable groups—bonded to the silicon atom. These are, for example, (meth)acryloxyalkyl-tri- or -di-alkoxysilanes such as meth-acryloxypropyltrimethoxysilane, vinyl-tri- or -di-alkoxysilanes, such as, for example, vinyl-trimethoxysilane or vinyltriethoxysilane, (cyclo)alkyl-tri- or -di-alkoxysilanes, such as methyltrimethoxysilane, (cyclohexyl)methyldimethoxysilane, tetraalkoxysilanes, such as tetraethoxysilane, tetramethoxysilane or tetrapropoxysilane or alkoxypolysilicates (esters of (poly)silicic acid), such as ethyl- or propyl-polysilicate, to name only a few. The further silanes can also be present in the synthesis of the iminosilanes (aldimine and/or ketimine from aminoalkylsilane and aldehyde or ketone), wherein co-condensates may be produced as a result of the water of reaction that is formed.

As mentioned, one form of implementation of the invention relates to the use of a hardener system described hereinabove and hereinbelow (having constituents a) and b1) and/or b2) which may be physically separate from one another during storage) for the production of a synthetic resin composition, especially as a hardener system of a multi-component kit that includes the synthetic resin composition according to the invention, and to a corresponding process for the production of such a hardener system, which includes the mixing of constituents a) and b1) and/or b2) on-site, optionally in the presence of further ingredients and constituent c).

A multi-component kit (or set) is especially to be understood as being a two-component kit (preferably a two-chamber or, furthermore, a multichamber device), in which the constituents a), b1) and/or b2) and c) that are capable of reacting with one another are contained in such a way that they cannot lead to undesired reactions during storage, that is to say they are present in components that are physically separate from one another. Capsules are a possibility. Especially suitable are cartridges having two components, in which the contents, after being mixed together or while being mixed together, are applied at the site of use (especially by means of a static mixer) to a recess, preferably a drilled hole. Corresponding uses are preferred.

In a possible preferred variant of a multi-component kit according to the invention, the constituents a) and c) are included in a component (K1), while constituent b) (b1 and/or b2) is included in a different component (K2) (that is not miscible, that is to say is separate, in the storage state), it being possible in each case optionally for one or more further additional ingredients to be present.

In the case of the use of free-radical starters b1) (at least one aldehyde and/or ketone (carbonyl compound) and on the other hand at least one primary amine) the constituents carbonyl compound and primary amine can also be provided in separate components (K1) and (K2) and therefore come into contact and possibly react with one another only on being mixed together during use in situ. Preferably the carbonyl compound and constituent c) are included in one component (K1), and the primary amine of the free-radical starters b1) is contained together with constituent a) in a different component (K2). One or more further additional ingredients can optionally be present.

Constituent b1) and/or b2) can likewise be included with constituent c) or constituent a) in one component, but this does not result in especially preferred forms of implementation of the invention; in each case optionally one or more further additional ingredients can be present and/or are necessary.

In one form of implementation of the invention, constituent c) can be present in both components (K1) and (K2), while constituents a) and b1) and/or b2) are then added separately from one another (separated so as not to be miscible in the storage state) to constituent c) in the respective individual components (K1) and (K2).

A variant of the use according to the invention provides that constituents b1) and/or b2) and c) are introduced into a drilled hole, while the anchor rod or, furthermore, a different material to be adhesively bonded is immersed in constituent a) (for example an activator-metal salt solution) and then introduced into the drilled hole provided with b1) and/or b2) and c).

Substrates (for example for drilled holes) are to be understood as being, for example, materials for walls, ceilings or floors in the building sector, for example masonry, concrete, wood, metal or, furthermore, plastics.

The following Examples illustrate the invention but do not limit the scope thereof.

In each of the following Examples the unmarked constituents of the model formulations are mixed in advance. The polymerisation is initiated by adding and mixing in the constituent marked "*X*".

The methods for determining parameters also apply to the general part of the description:

Determination of the Gel Time

The gel time is determined manually using a commercially available stopwatch and a commercially available thermometer at room temperature (approximately 23° C.). For that purpose all constituents are mixed together and the temperature of the sample is measured immediately after the mixing. The sample itself is located in a plastics beaker. Evaluation is carried out in accordance with DIN 16945. The gel time is the time at which the temperature exceeds 35° C. This corresponds to a rise in temperature of about 10 K.

Determination of the Processing Time

The processing time is determined in a plastics beaker at room temperature by means of manual stirring. On reaching the gelling point, the sample, which was previously liquid, becomes highly viscous and gel-like, which becomes apparent inter alia by the formation of lumps. At that point, the watch, which was started after the beginning of the test, is stopped. The processing time can be read off directly.

Pull-Out Tests from Concrete

For pull-out tests using threaded rods M12, the following procedure, in accordance with ETAG 001 PART 5, is carried out:

First of all, a hammer drill is used to drill holes (diameter 14 mm; depth 95 mm) in a concrete test specimen (concrete type C20/25) lying in a horizontal position. The drilled holes are cleaned using a hand blower and a hand brush. The drilled holes are then filled two-thirds full with the particular curable composition for fixing purposes to be tested. A threaded rod is pushed into each drilled hole by hand. The excess mortar is removed using a trowel. After 24 hours at room temperature, the threaded rod is subjected to pulling until it fails, the failure load being measured.

For the production of the following exemplary formulations, the following constituents and abbreviations are used.

TABLE 1

Constituents and abbreviations used

| Abbreviation | Item name |
|---|---|
| RF | Resin formulation |
| IPDA | Isophoronediamine |
| DCH | 1,2-Diaminocyclohexane |
| EDR148 | Jeffamine EDR-148 (Huntsman Corporation, The Woodlands, Texas, USA) |
| D230 | Jeffamine D230 (Huntsman Corporation, The Woodlands, Texas, USA) |
| MXDA | Meta-xylylenediamine |
| BAC | 1,3-Bis(aminomethyl)cyclohexane |
| DETDA | Diethyltoluenediamine |
| AM | 3-Aminopropyltrimethoxysilane |
| BDDMA | 1,4-Butanediol dimethacrylate |
| HPMA | 2-Hydroxypropyl methacrylate |

TABLE 1-continued

Constituents and abbreviations used

| Abbreviation | Item name |
|---|---|
| UM | Urethane methacrylate |
| SR210 | PEG200DMA: Polyethylene glycol-200-dimethacrylate (Sartomer) |
| CN159 | Epoxymethacrylate based on bisphenol A (Sartomer) |
| VPLS2142 | CSTICO ®phen VP LS 2142 (csc jäklechemie GmbH & Co. KG) |
| SolCop8 | Soligen Copper 8 (Cu carboxylate, active content: 7.8-8.2%, OMG Borchers GmbH) |
| Iro7/8 | Octa Soligen Iro 7/8 (iron carboxylate, active content: 7.3-7.7%, OMG Borchers GmbH) |
| Mn(III) | Manganese(III) acetate 3% in HPMA |
| OxyC | Borchers Oxy Coat (highly activated iron; OMG Borchers GmbH) |
| VP0132 | Borchers VP0132 (vanadium carboxylate, active content: 4.9-5.1%, OMG Borchers GmbH) |
| CF31 | Nouryact CF31 (metal complex, Akzo Nobel Functional Chemicals B.V.) |
| SolMn6 | Soligen Manganese 6 (manganese naphthenate, active content: 6%, OMG Borchers GmbH) |
| Mn6 | Octa Soligen Manganese 6 (manganese octoate, active content: 6%, OMG Borchers GmbH) |
| t-BBC | Tert-butyl pyrocatechol |
| t Temp. > 35° C. | Time until the temperature exceeds 35° C. [hh:mm:ss] (=gel time) |
| $T_{max}$ | Maximum temperature achieved [° C.] |
| END15 | Umicore Ecos ND15 (polymer dry substance, active content: 4%, Umicore Specialty Materials Brugge NV) |
| DCer | Duroct Cerium 6% (cerium carboxylate, active content: 6%, DURA Chemicals Inc.) |
| NDryC | Nuodex Dry Coat (highly activated manganese-amine complex, active content: 1%, Rockwood Pigments Durham) |
| $CuSO_4H_2O$ | Copper sulfate 15% in water |
| $CuSO_4MEG$ | Copper sulfate 5% in monoethylene glycol |
| LS2965 | Desmophen LS 2965 (BayerMaterialScience) |
| Isob | Isobutyraldehyde |
| 2MVal | 2-Methylvaleraldehyde |
| Val | Valeraldehyde |
| MIBK | Methyl isobutyl ketone |
| H18 | Wacker HDK H18 (synthetic, hydrophobic, amorphous silica produced by flame hydrolysis) |
| H30RA | Wacker HDK H30RA (amine-functionalised pyrogenic silica) |

Example 1: General Working Procedure I: Alternative Synthesis of Aldimines

The appropriate amine is placed in a round-bottomed flask. With vigorous stirring, the aldehyde is slowing added from a dropping funnel, during which the temperature of the mixture rises. Once the addition is complete, the volatile constituents are not removed. Depending upon the amine used ("hydrophobic" amines), the water of reaction that forms separates from the aldimine. The residual water present in the aldimine does not interfere with its use as initiator. Using "hydrophilic" amines, no phase separation takes place. If desired, it is also possible for the aldehyde to be used as initial charge and the amine to be added dropwise. The reaction (freedom from imine groups demonstrable by IR spectroscopy) is checked by means of FT-IR.

Example 2: Exemplary Formulation for an Aldimine from Isobutyraldehyde and Jeffamine D230

The formulation for an aldimine produced or producible according to Example 1 (general working procedure I) is as follows:

TABLE 2

Formulation for aldimine from isobutyraldehyde and Jeffamine D230

| Raw material | m [g] | M [g/mol] | n [mol] | % by weight |
|---|---|---|---|---|
| Isobutyraldehyde | 15.00 | 72.11 | 0.208 | 38.54 |
| D230 | 23.92 | 230.00 | 0.104 | 61.46 |
| Total | 38.92 | | | 100.00 |

The water of reaction that forms slowly separates from the aldimine and collects at the bottom of the flask.

The aldimines used below are produced analogously to general working procedure I, or are commercially available.

Example 3: Simplified Resin Formulations

For the simplified resin formulations the following raw materials are mixed together:

TABLE 3

Simplified resin formulation I (RFI)

| Raw material | % by weight |
|---|---|
| Ethoxylated bisphenol-A-dimethacrylate* | 88.76 |
| BDDMA | 7.14 |
| HPMA | 4.10 |

*technical product - various degrees of ethoxylation possible.

TABLE 4

Simplified resin formulation II (RFII)

| Raw material | % by weight |
|---|---|
| UM resin | 54.86 |
| BDDMA | 40.00 |
| HPMA | 5.00 |
| Additives | 0.14 |

The UM resin is produced in a manner known to the person skilled in the art. Reference is made here by way of example to the patent DE 4111828 A1. As isocyanate there is used a polymeric diphenylmethanediisocyanate with isomers and higher homologues.

TABLE 5

Simplified resin formulation III (RFIII)

| Raw material | % by weight |
|---|---|
| Ethoxylated bisphenol-A-dimethacrylate* | 80.00 |
| SR210 | 20.00 |

*technical product - various degrees of ethoxylation possible.

The simplified resin formulation III is particularly interesting for the production of non-hazard-classified reactive resins and fixing systems and constitute particularly preferred implementations of the invention.

Example 4: Determination of the Gel Times with VPLS2142 as Free-Radical Starter B2)

In order to assess the applicability of the hardener system imine-metal salt to cold-hardening vinyl ester resins, exemplary formulations with the above-described resin formulation I and various metal salts are prepared. As free-radical starter there is used an imine from isobutyraldehyde and isophoronediamine (CSTICO® phen VP LS 2142). Table 6 below lists the gel times and the maximum temperatures achieved during the polymerisations:

TABLE 6

Gel times of the initiator systems from VPLS2142 and varying metal salts

| Item name | RFI [g] | VPLS2142 [g] | Metal salt [g] | Total [g] | Metal | t Temp. >35° C. [hh:mm:ss] | $T_{max}$ [° C.] |
|---|---|---|---|---|---|---|---|
| VPLS2142-004 | 9.75 | 0.25$^X$ | 0.10 | 10.10 | SolCop8 | 00:00:57 | 89.1 |
| VPLS2142-006 | 9.75 | 0.25$^X$ | 0.10 | 10.10 | Mn(III) | 00:02:06 | 74.9 |
| VPLS2142-007 | 9.75 | 0.25$^X$ | 0.10 | 10.10 | OxyC | 00:02:17 | 71.0 |
| VPLS2142-008 | 9.75 | 0.25$^X$ | 0.10 | 10.10 | VP0132 | 00:00:20 | 100.0 |
| VPLS2142-010 | 9.75 | 0.25$^X$ | 0.10 | 10.10 | CF31 | 00:01:23 | 88.7 |
| Comp-Ex-01 | 9.75 | 0.25 | — | 10.00 | — | >04:00:00 | — |
| Comp-Ex-02 | 9.75 | — | 0.10 | 9.85 | SolCop8 | >18:00:00 | — |

$^X$added as hardener

It will be apparent from Table 6 that using the exemplary formulations exothermic and in some cases rapid polymerisations of vinyl ester resins at room temperature are achieved. In addition, Table 6 shows that the hardener system imine-metal salt functions with all metals. The Comparison Examples Comp-Ex-01 and Comp-Ex-02, which are not according to the invention, show that without the presence of constituent a) or b2), no effective polymerisations are initiated.

Example 5: Determination of the Processing Times with VPLS2142 as Initiator B2)

Table 7 shows the processing times of the initiator system consisting of CSTICO® phen VP LS 2142 in combination with Octa Soligen Manganese 6 with different contents of initiator and metal salt:

The model mixtures from Table 7 show that both the initiator b2) and the metal salt can be varied within wide ranges (see in this connection also the molar ratios n (C═C):n (N═C) (imine increment) and n (N═C):n (metal). The use of an aerobic inhibitor and the retarding effect thereof is shown with reference to the model mixture VPLS2142-021.

Example 6: Determination of the Gel Times with SolCop8 or SolMn6 and Varying Aldimines as Free-Radical Starter B2)—Variation of the Amines and the Aldehydes Tables 8a and 8b below illustrate the gel times and the maximum temperatures achieved during the polymerisations of the hardener systems consisting of Soligen Copper 8 or Soligen Manganese 6 and different imines:

TABLE 7

Processing times of the initiator systems from VPLS2142 and Mn6.

| Item name | RFI [g] | VPLS2142 [g] | Mn6 [g] | Total [g] | $t_{processing\ time}$ (hh:mm:ss) | n (C═C):n (N═C) | n (N═C):n (Mn) |
|---|---|---|---|---|---|---|---|
| VPLS2142-013 | 9.75 | 0.10 | 0.10$^X$ | 9.95 | 00:01:14 | 74 | 6 |
| VPLS2142-015 | 9.75 | 0.50 | 0.10$^X$ | 10.35 | 00:00:34 | 15 | 29 |
| VPLS2142-017 | 9.75 | 0.10 | 0.02$^X$ | 9.87 | 00:01:54 | 74 | 29 |
| VPLS2142-018 | 9.75 | 0.05 | 0.01$^X$ | 9.81 | 00:03:22 | 147 | 29 |
| VPLS2142-020 | 9.75 | 0.10 | 0.20$^X$ | 10.05 | 00:01:04 | 74 | 3 |
| VPLS2142-021 | 9.75 | 0.25 | 0.10$^X$ | 10.20*$^1$ | 00:08:15 | | |
| VPLS2142-023 | 9.75 | 7.37 | 0.10$^X$ | 17.22 | 00:00:20 | 1 | 430 |
| VPLS2142-026 | 9.75 | 0.0025*$^2$ | 0.10$^X$ | 10.10 | 00:56:30 | 2950 | 0.15 |

$^X$added as hardener
*$^1$additionally 0.1 g of t-BBC 10% in BDDMA weighed in.
*$^2$0.25 g of a 1% solution of VPLS2142 in BDDMA weighed in.

TABLE 8a

Gel times of the initiator systems from SolCop8 and various aldimines (produced in each case from isobutyraldehyde and varying amines)

| Item name | RFI [g] | Aldimine [g] | SolCop8 [g] | Total [g] | Amine | t Temp. >35° C. [hh:mm:ss] | $T_{max}$ [° C.] |
|---|---|---|---|---|---|---|---|
| Isob-MXDA | 9.75 | $0.25^X$ | 0.10 | 10.10 | MXDA | 00:00:52 | 87.6 |
| Isob-BAC | 9.75 | $0.25^X$ | 0.10 | 10.10 | 1,3-BAC | 00:00:46 | 95.9 |
| Isob-EDR148 | 9.75 | $0.25^X$ | 0.10 | 10.10 | EDR148 | 00:01:17 | 97.0 |
| Isob-DCH | 9.75 | $0.25^X$ | 0.10 | 10.10 | DCH | 00:01:13 | 93.2 |
| Isob-DETDA | 9.75 | $0.25^X$ | 0.10 | 10.10 | DETDA | 00:20:07 | 39.6 |

$^X$added as hardener

TABLE 8B

Gel times of the initiator systems from SolMn6 and various aldimines (produced in each case from Jeffamine D230 and varying aldehydes).

| Item name | RFI [g] | Aldimine [g] | SolMn6 [g] | Total [g] | Aldehyde/ketone | t Temp. >35° C. [hh:mm:ss] | $T_{max}$ [° C.] |
|---|---|---|---|---|---|---|---|
| Isob-D230-005 | 9.75 | $0.25^X$ | 0.10 | 10.10 | Isob | 00:01:47 | 96.6 |
| 2MVal-D230 | 9.75 | $0.25^X$ | 0.10 | 10.10 | 2MVal | 00:01:43 | 94.8 |
| Val-D230 | 9.75 | $0.25^X$ | 0.10 | 10.10 | Val | 00:12:25 | 42.8 |
| LS2965 | 9.75 | $0.25^X$ | 0.10 | 10.10 | MIBK | —* | —* |

$^X$added as hardener
*fully hardened the next day

Tables 8a and 8b clearly show that the vinyl ester resin formulation can be polymerised very satisfactorily using an extremely wide variety of free-radical starters b2). In addition, Table 8a is intended to underline that all kinds of primary amines can be used for the production of the imines without suffering any loss or impairment of the polymerisation-initiating action. It will be apparent from Table 8b that the aldehydes that are especially preferred—for imine synthesis—polymerise significantly more quickly and with greater exothermy. Table 8a further shows that any (residual) water of reaction present (for example Isob-DCH) or even homogeneously distributed water of reaction (for example Isob-EDR148) has no effect on the polymerisation.

Example 7: Determination of the Gel Times with the Aldimine Isob-AM as Initiator B2)

The aldimine Isob-AM is produced from the two starting materials isobutyraldehyde and 3-aminopropyltrimethoxysilane. Silanes are reactive towards water and therefore react with hydrolysis and condensation. By virtue of that fact, during the aldimine synthesis oligomerisation of the silane units takes place in situ as a result of the water of reaction. It is therefore possible to generate REACH-polymeric initiators. Table 9 shows the gel times and the associated maximum achieved temperatures of the hardener systems Isob-AM with varying metal salts.

TABLE 9

Gel times of the initiator systems from Isob-AM and varying metal salts

| Item name | RFI [g] | Isob-AM [g] | Metal salt [g] | Total [g] | Metal | t Temp. >35° C. [hh:mm:ss] | $T_{max}$ [° C.] |
|---|---|---|---|---|---|---|---|
| Isob-AM-001 | 9.75 | 0.25 | $0.10^X$ | 10.10 | SolCop8 | 00:01:00 | 95.1 |
| Isob-AM-003 | 9.75 | 0.25 | $0.10^X$ | 10.10 | OxyC | 00:01:36 | 80.1 |
| Isob-AM-004 | 9.75 | 0.25 | $0.10^X$ | 10.10 | VP0132 | 00:00:18 | 86.7 |
| Isob-AM-010 | 9.75 | 0.25 | $0.10^X$ | 10.10 | CF31 | 00:00:58 | 90.5 |
| Isob-AM-014 | 9.75 | 0.25 | $0.10^X$ | 10.10 | END15 | 00:01:53 | 85.3 |
| Isob-AM-021 | 9.75 | 0.25 | $0.10^X$ | 10.10 | DCer | 00:07:16 | 74.4 |
| Isob-AM-029 | 9.75 | 0.25 | $0.10^X$ | 10.10 | NDryC | 00:02:13 | 84.8 |

$^X$added as hardener

It is also apparent from the model formulations of Table 9 that an exothermic and in some cases rapid polymerisation of methacrylates at room temperature can be achieved with different metal salts. Furthermore, Table 9 is intended to emphasise that not only monomeric initiators but also oligomeric up to polymeric (REACH polymer) initiators can be used. The model mixture Isob-AM-029 is especially interesting for coating applications, because the activator used therein does not have an inherent colour in the resin, that is to say it has a colourless appearance.

Example 8: Pull-Out Tests from Concrete with Free-Radical Starters B2)

Setting tests are carried out in accordance with the aforementioned parameters for "pull-out tests from concrete".

TABLE 10

Formulations for carrying out setting tests and bond stresses determined with free-radical starters b2)

| Item name | ST-Isob-MXDA-001 | ST-Isob-D230-001 | ST-Isob-AM-001 | ST-VPLS2142-016 |
|---|---|---|---|---|
| RFI [g] | 29.13 | 28.85 | 29.13 | 29.07 |
| Aldimine [g] | 0.75 | 1.48 | 0.75 | 0.75 |
| Metal salt [g] | $0.30^X$ SolCop8 | $0.30^X$ Iro7/8 | $0.30^X$ OxyC | $0.47^X$ CuSO$_4$ |
| Sand [g] | 44.82 | 44.38 | 44.82 | 44.72 |
| Total [g] | 75.00 | 75.00 | 75.00 | 75.00 |
| Bond stress [N/mm$^2$] | 20.1 | 17.1 | 19.5 | 17.9 |

$^X$added as hardener

The appropriate starting materials for the aldimines can be assigned by reference to the abbreviations used in the item names and to Table 1 above which gives the abbreviations. Table 10 shows that the hardener system according to the invention is very effective and, in addition, indicates the enormous potential of such initiator systems.

Example 9: Determination of the Gel Times with Free-Radical Starters B1) and Varying Metal Salts In order to demonstrate the applicability of free-radical starters b1) in combination with metal salts, exemplary formulations with the above-described resin formulation I (RFI) and different metal salts are produced. Table 11 below shows the gel times and the maximum temperatures achieved during the curing reactions.

TABLE 11

Gel times of the hardener systems consisting of Isob and D230 in combination with different metal salts.

| Item name | RFI [g] | D230 [g] | Metal [g] | Isob [g] | Total [g] | Metal | t Temp. >35° C. [hh:mm:ss] | $T_{max}$ [° C.] |
|---|---|---|---|---|---|---|---|---|
| Process-Metals-001 | 9.75 | 0.24 | 0.10 | $0.15^X$ | 10.24 | SolCop8 | 00:02:35 | 99.6 |
| Process-Metals-002 | 9.75 | 0.24 | 0.10 | $0.15^X$ | 10.24 | Iro7/8 | 00:07:16 | 69.6 |
| Process-Metals-003 | 9.75 | 0.24 | 0.10 | $0.15^X$ | 10.24 | OxyC | 00:02:56 | 71.1 |
| Process-Metals-004 | 9.75 | 0.24 | 0.10 | $0.15^X$ | 10.24 | VP0132 | 00:00:52 | 82.4 |
| Process-Metals-005 | 9.75 | 0.24 | 0.10 | $0.15^X$ | 10.24 | SolMn6 | 00:03:30 | 92.3 |
| Process-Metals-011 | 9.75 | 0.24 | 0.10 | $0.15^X$ | 10.24 | END15 | 00:13:16 | 83.2 |
| Process-Metals-015 | 9.75 | 0.24 | 0.10 | $0.15^X$ | 10.24 | CuSO$_4$ H$_2$O | 00:05:14 | 84.6 |
| Process-Metals-016 | 9.75 | 0.24 | 0.10 | $0.15^X$ | 10.24 | CuSO$_4$ MEG | 00:05:06 | 92.8 |

$^X$added as hardener

Table 11 shows that the free-radical starters b1) according to the invention in combination with metal salts also initiate polymerisations of unsaturated reactive resins at room temperature. Moreover, it will be apparent from the model formulations that all metal salts can be used for that purpose. The possible use and the functionality of metal salts of inorganic and inorganic acids is shown in the formulations Process-Metals-001 (metal salt of organic acids) and Process-Metals-015 and Process-Metals-016 (metal salt of inorganic acids).

Example 10: Determination of the Gel Times with Free-Radical Starters B1) and SolMn6/SolCop8 as Metal Salts Table 12 below illustrates the gel times and the maximum achieved temperatures of the free-radical starters b1) according to the invention using different amines and aldehydes.

TABLE 12

Gel times of free-radical starters b1) with varying amines and aldehydes

| Item name | RFI [g] | Aldehyde [g] | Metal [g] | Amine [g] | Total [g] | Amine/ aldehyde | t Temp. >35° C. [hh:mm:ss] | $T_{max}$ [° C.] |
|---|---|---|---|---|---|---|---|---|
| Process-Amines-001 | 9.75 | 0.15 | 0.10 SolMn6 | 0.37$^X$ | 10.37 | AMMO/ Isob | 00:01:50 | 89.4 |
| Process-Amines-002 | 9.75 | 0.15 | 0.10 SolMn6 | 0.14$^X$ | 10.14 | MXDA/ Isob | 00:03:27 | 68.2 |
| Process-Amines-004 | 9.75 | 0.15 | 0.10 SolMn6 | 0.15$^X$ | 10.15 | BAC/ Isob | 00:03:37 | 91.3 |
| Process-Ald-001 | 9.75 | 0.15$^X$ | 0.10 SolCop8 | 0.24 | 10.24 | D230/ Isob | 00:02:12 | 104.8 |
| Process-Ald-002 | 9.75 | 0.21$^X$ | 0.10 SolCop8 | 0.24 | 10.30 | D230/ 2MVal | 00:03:35 | 94.4 |
| Comp-Ex-03 | 9.75 | 0.15 | 0.10 SolCop8 | — | 10.00 | —/Isob | >18:00:00 | — |
| Comp-Ex-04 | 9.75 | 0.15 | — | 0.24 | 10.14 | D230/ Isob | >04:00:00 | — |
| Comp-Ex-05 | 9.75 | — | 0.10 SolCop8 | 0.24 | 10.09 | D230/— | >18:00:00 | — |

$^X$added as hardener

Table 12 shows that not only a variety of primary amines but also a variety of aldehydes can be used as free-radical starters b1) according to the invention. This is demonstrated by the rapid and exothermic polymerisations. The Comparison Examples Comp-Ex-03 to Comp-Ex-05, which are not according to the invention, show that effective polymerisations do not take place in the absence of a constituent of the hardener systems according to the invention.

Example 11: Determination of the Gel Times with Free-Radical Starters B1) Using Amine-Functionalised Fillers Table 13 below is intended to show the possibility of using amine-functionalised or amine-silanised fillers as polyamines in free-radical starters b1).

TABLE 13

Gel times of the free-radical starters b1) with amine-functionalised fillers as polyamines

| Item name | RFI [g] | H30RA [g] | Metal [g] | Isob [g] | Total [g] | Metal | t Temp. >35° C. [hh:mm:ss] | $T_{max}$ [° C.] |
|---|---|---|---|---|---|---|---|---|
| H30RA-06 | 9.75 | 1.16 | 0.10 | 0.03$^X$ | 11.04 | SolCop8 | 00:06:26 | 78.9 |
| H30RA-07 | 9.75 | 1.16 | 0.10 | 0.03$^X$ | 11.04 | CuSO$_4$ MEG | 00:08:44 | 72.1 |
| H30RA-08 | 9.75 | 1.16 | 0.10 | 0.03$^X$ | 11.04 | OxyC | 00:05:41 | 61.1 |

$^X$added as hardener

The amine-functionalised silica used has an approximate nitrogen content of 0.5%. Table 13 shows that amine-functionalised fillers can also be used as polyamines for free-radical starters b1) and accordingly the reactive resin can be polymerised very satisfactorily.

Example 12: Pull-Out Tests from Concrete with Free-Radical Starters B1)

In order also to show the performance potential of the free-radical starters b1) in an as application-oriented way as possible, setting tests are carried out in accordance with the afore-mentioned parameters for "pull-out tests from concrete".

TABLE 14

Formulations for carrying out setting tests and bond stresses determined with free-radical starters b1).

| Item name | ST-Process-01 | ST-Process-02 | ST-Process-03 | ST-Process-04 | ST-Process-05 | ST-Process-06 | ST-Process-08 | ST-Process-16 |
|---|---|---|---|---|---|---|---|---|
| RFI or II | 28.97 | 28.97 | 28.97 | 28.97 | 28.97 | 28.91 | 28.82 | 28.97 |
| Isob [g] | 0.45 | 0.45 | $0.45^X$ | $0.45^X$ | 0.45 | 0.59 | 0.44 | 1.34 |
| SolCop8 [g] | 0.30 | 0.30 | 0.30 | 0.30 | $0.30^X$ | $0.30^X$ | $0.30^X$ | $0.30^X$ |
| Sand [g] | 44.57 | 44.57 | 44.57 | 44.57 | 44.57 | 44.48 | 44.34 | 42.25 |
| D230 [g] | $0.71^X$ | $0.71^X$ | 0.71 | 0.71 | $0.71^X$ | $0.71^X$ | $1.09^X$ | $2.14^X$ |
| Total [g] | 75.00 | 75.00 | 75.00 | 75.00 | 75.00 | 75.00 | 75.00 | 75.00 |
| Bond stress [N/mm$^2$] | 18.6 | 16.1 | 17.5 | 14.1 | 17.2 | 13.9 | 17.1 | 22.0 | the raw materials marked $^X$ are added as hardener or hardener formulation.

In formulations ST-Process-02 and ST-Process-04, instead of the simplified resin formulation I (RFI) there is used the urethane-methacrylate-based resin formulation II (RFII) according to Example 3. In formulation ST-Process-06, 2-methylvaleraldehyde is used instead of isobutyraldehyde. In formulation ST-Process-08, the metal salt SolCop8 and the amine D230 are replaced by OxyC and AM. Table 14 shows that the free-radical starters b1) in combination with metal salts also form effective hardener systems for unsaturated reactive resins and achieve suitable bond stresses. Formulations ST-Process-01 and ST-Process-02 show that it is also possible for different basic resins to be hardened with the initiator system according to the invention. Moreover, in formulations ST-Process-01, ST-Process-03 and ST-Process-05 it becomes apparent that the constituents of the free-radical starters b1) and the hardener systems according to the invention can in each case be employed as hardener or hardener formulations and so a variety of distributions between different components are possible.

Example 13: Gel Times of Free-Radical Starters B1) and B2) Using Non-Hazard-Classified Reactive Resins Non-hazard-classified reactive resins and fixing systems are playing an increasing role in the field of chemical fixing technology. In this field the initiator systems according to the invention exhibit great advantages over the previous prior art and for the first time allow the formulation of non-hazard-classified multi-component reactive resin systems. Table 15 shows the gel times and the maximum temperatures achieved during the polymerisations of non-hazard-classified reactive resin formulations initiated by the free-radical starters b1) and b2) according to the invention.

TABLE 15

Gel times of the free-radical starters b1) and b2) in non-hazard-classified reactive resins

| Item name | NHCR-01 | NHCR-06 | NHCR-03 | NHCR-04 | NHCR-05 |
|---|---|---|---|---|---|
| RFIII [g] | 9.85 | 9.95 | 9.75 | 9.75 | 9.85 |
| VPLS2142 [g] | $0.10^X$ | $0.10^X$ | — | — | $0.10^X$ |
| Isob [g] | — | — | 0.15 | $0.15^X$ | — |
| SolCop8 [g] | 0.10 | 0.05 | 0.10 | — | — |
| CuSO$_4$ MEG [g] | — | — | — | 0.10 | 0.10 |
| D230 [g] | — | — | $0.24^X$ | 0.24 | — |
| Total [g] | 10.05 | 10.10 | 10.24 | 10.24 | 10.05 |
| t Temp > 35° C. [hh:mm:ss] | 00:01:50 | 00:02:37 | 00:09:35 | 00:09:29 | 00:03:41 |
| T$_{max}$ [° C.] | 110.0 | 82.3 | 80.4 | 92.4 | 95.7 | the raw materials marked $^X$ are added as hardener.

In the exemplary formulation NHCR-01, instead of the simplified resin formulation RFIII there is used a reactive resin based on epoxymethacrylate (CN159) and a reactive diluent (SR210)—ratio 50:50. In addition, in formulation NHCR-06 the reactive diluent (SR210) of the simplified resin formulation III is replaced by a biobased reactive diluent (Sarbio6105). Table 15 shows that the hardener systems according to the invention also lead to an exothermic and effective polymerisation of non-hazard-classified and partially biobased reactive resins.

Example 14: Referencing Tests in Comparison with EP 2 824 117 A1

In order to demonstrate that the imines suitable for use according to the invention (free-radical starters b1) and/or b2)) in combination with metal salts lead to significantly more effective initiator systems and to higher bond stresses in comparison with the tertiary aliphatic amines claimed in EP 2 824 117 A1, the following referencing tests (RefT) are carried out:

RefT-1: Assessment of Curing with PMDETA as Initiator and Varying Metal Salts

In order to assess the applicability of the initiator system PMDETA-metal salt to cold-hardening vinyl ester resins, exemplary formulations with the above-described resin formulation I and various metal salts—analogous to Example 4—are prepared.

TABLE 16a

PMDETA as initiator with varying metal salts

| Item name | RFI [g] | PMDETA [g] | Metal salt [g] | Total [g] | Metal | Note |
|---|---|---|---|---|---|---|
| PMDETA-001 | 9.75 | 0.25 | 0.10$^X$ | 10.10 | SolCop8 | liquid* |
| PMDETA-009 | 9.75 | 0.50 | 0.10$^X$ | 10.35 | SolCop8 | gelled* |
| PMDETA-002 | 9.75 | 0.25 | 0.10$^X$ | 10.10 | Iro7/8 | liquid* |
| PMDETA-003 | 9.75 | 0.25 | 0.10$^X$ | 10.10 | VP0132 | liquid* |
| PMDETA-004 | 9.75 | 0.25 | 0.10$^X$ | 10.10 | OxyC | liquid* |
| PMDETA-005 | 9.75 | 0.25 | 0.10$^X$ | 10.10 | Mn6 | liquid* |

$^X$added as hardener
*after 24 h

It will be clear from Table 16a that the concentrations analogous to Example 4 in the hardener systems PMDETA—metal salts do not lead to polymerisation of the vinyl ester resin. Only by increasing the concentration of initiator (PMDETA-009) was gelling ascertained.

RefT-2: Pull-Out Tests from Concrete with PMDETA as Initiator

Example 1 and Example 4a of EP 2 824 117 A1 are subjected to a setting test. Table 16b shows the formulations for carrying out setting tests and the bond stresses determined.

TABLE 16b

Formulations for carrying out setting tests for differentiation and bond stresses determined

| Item name | ST-PMDETA-010 | ST-PMDETA-011 | ST-PMDETA-012 | ST-PMDETA-013 |
|---|---|---|---|---|
| BDDMA [g] | 26.46 | — | 27.97 | — |
| RFI [g] | — | 26.84 | — | 28.37 |
| PMDETA [g] | 2.28 | 2.31 | 1.12 | 1.13 |
| SolCop8 [g] | 1.40 | 1.42 | 0.56 | 0.57 |
| Sand [g] | 43.81 | 44.43 | 44.29 | 44.92 |
| H18 | 1.05 | — | 1.05 | — |
| Total [g] | 75.00 | 75.00 | 75.00 | 75.00 |
| Bond stress [N/mm$^2$] | 0.37 | 1.56 | 1.02 | 0.10 |

Since in Examples 1 and 4a of EP 2 824 117 A1 solely BDDMA is used as vinyl ester resin, further setting tests are carried out using the resin formulation RFI. For reinforcement, sand is added in amounts analogous to "Example 8: Pull-out tests from concrete". The bond stresses determined for the hardener system PMDETA—copper(II) salt are significantly below those of the hardener systems according to the invention (see Table 10).

Consequently it has been established that the initiator system imine—metal salt according to the invention leads to hardener systems that are significantly more effective and capable of greater variation than the systems claimed in EP 2 824 117 A1. This is manifested both in the higher bond stresses and in the wider choice of possible metal salts as accelerator, which is not limited to copper only. As a fundamental difference with respect to EP 2 824 117 A1 it has again been established that the free-radical starters in the form of imines (aldimines and/or ketimines) suitable for use according to the invention contain an sp$^2$-hybridised nitrogen. The nitrogen-containing ligands in the form of a tertiary aliphatic amines claimed in the EP have sp$^3$-hybridised nitrogen atoms.

The invention claimed is:

1. A hardener system for a synthetic resin composition which includes free-radical-polymerisable compounds, comprising:
   at least one activator in the form of a metal salt; and,
   with no addition of other initiators, as initiator a free-radical starter comprising one or both of:
   (b1) at least one aldehyde and/or ketone which has at least one or more primary and/or secondary hydrogen atoms at the carbon atom in the α-position to the carbonyl group and at least one primary amine; and
   (b2) an imine obtained by reaction of at least one aldehyde and/or ketone which has at least one or more primary and/or secondary hydrogen atoms at the carbon atom in the α-position to the carbonyl group with at least one primary amine, which imine includes one or more imine structural increments of the formula (I):

(I)

wherein independently of one another:
the wavy line represents an organic radical of an amine, or hydrogen; and
R$_2$ and R$_3$ each independently of the other denotes hydrogen or an unsubstituted or substituted organic radical which includes at least one aliphatic, heteroaliphatic, alicyclic or heterocyclic molecular structure, or a salt thereof.

2. The hardener system according to claim 1, wherein:
the at least one activator in the form of a metal salt comprises one or more salts of organic and/or inorganic acid with one or more metals, the one or more metals comprising one or more of copper, iron, vanadium, manganese, cerium, cobalt, zirconium, and bismuth; the inorganic acid comprising one or more of a sulfate radical and a carbonate radical; and the organic acid comprising a carboxylate radical; and
the free-radical starter comprises (b2) the imine which includes one or more imine structural increments of the formula (I), the imine comprising at least one aldimine or ketimine, obtained by condensation, with removal of water, of a mono-, di- or poly-amine with one or more aldehydes or ketones, wherein:
the mono-, di- or poly-amine comprises one or more of aminol; alkyl/alkylene(mono- or di-)amine; cycloalkyl/cycloalkylene(mono- or di-)amine; heterocycloalkyl/heterocycloalkylene(mono- or di-)amine; a compound of the formula H$_2$N—(CH$_2$)$_i$—NH—[(CH$_2$)$_j$—NH]$_k$—(CH$_2$)$_l$—NH$_2$, wherein i, j and l each independently of the others denotes from 2 to 4 and k denotes 0, 1, 2, 3 or 4; aminoamide; polyaminoamide; Mannich base; amine adduct; and aminoalkylsilane that includes at least one hydrolysable group; and
the one or more aldehydes or ketones are of the formula (II),

(II)

wherein:
R$_2$, R$_3$ each independently of the other denotes hydrogen or an unsubstituted or substituted organic radical which includes at least one aliphatic, heteroaliphatic, alicyclic, or heterocyclic molecular structure; and
the one or more aldehydes and/or ketones are compounds which have at least one or more primary and/or secondary hydrogen atoms at the carbon atom in the α-position to the carbonyl group.

3. The hardener system according to claim 1, wherein (b2) the imine which includes one or more imine structural increments of the formula (I) includes one or more aldimines and no ketimine.

4. The hardener system according to claim 1, wherein:
the activator in the form of a metal salt comprises one or more salts of organic and/or inorganic acids with metals, the one or more metals comprising one or more of copper, iron, vanadium, manganese, cerium, cobalt, zirconium, and bismuth; the inorganic acid comprising one or more of a sulfate radical and a carbonate radical; and the organic acid comprising a carboxylate radical; and
the free-radical starter comprises (b2) the imine which includes one or more imine structural increments of the formula (I), the imine comprising at least one aldimine or ketimine, obtained by condensation, with removal of water, of a mono-, di- or poly-amine with one or more aldehydes or ketones, wherein:
the mono-, di- or poly-amine comprises one or more of aminol; alkyl/alkylene(mono- or di-)amine; cycloalkyl/cycloalkylene(mono- or di-)amine; heterocycloalkyl/heterocycloalkylene(mono- or di-)amine; a compound of the formula H$_2$N—(CH$_2$)$_i$—NH—[(CH$_2$)$_j$—NH]$_k$—(CH$_2$)$_l$—NH$_2$, wherein i, j and l each independently of the others denotes from 2 to 4 and k denotes 0, 1, 2, 3 or 4; aminoamide, polyaminoamide, Mannich base, amine adduct; and aminoalkylsilane that includes at least one hydrolysable group; and
the one or more aldehydes or ketones are of the formula (II),

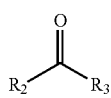

wherein:
R$_2$, R$_3$ each independently of the other denotes hydrogen or an unsubstituted or substituted organic radical which includes at least one aliphatic, heteroaliphatic, alicyclic, or heterocyclic molecular structure; and
the one or more aldehydes and/or ketones are compounds which have at least one or more primary and/or secondary hydrogen atoms at the carbon atom in the α-position to the carbonyl group; and
the free-radical starter further comprises at least one aldehyde and/or ketone and as primary amine and one or more aminosilanised fillers that carry primary amino groups.

5. The hardener system according to claim 1, wherein (b2) the imine which includes one or more imine structural increments of the formula (I) includes one or more aldimines as a reaction product of isobutyraldehyde and 3-aminopropyl-trimethoxysilane; of isobutyraldehyde and m-xylylenediamine; of isobutyraldehyde and 1,3-bis(aminomethyl)-cyclohexane; of isobutyraldehyde and amine-functionalised polyoxyalkylene; isophoronediamine; of isobutyraldehyde and; of isobutyraldehyde and diethyltoluenediamine; and of isobutyraldehyde and cyclohexane-1,2-diamine; or mixtures of two or more of those reaction products.

6. The hardener system according to claim 1, wherein:
the activator in the form of a metal salt comprises one or more salts of organic and/or inorganic acid with one or more metals, the one or more metals comprising one or more of copper, iron, vanadium, manganese, cerium, cobalt, zirconium, and bismuth; the inorganic acid comprising one or more of a sulfate radical and a carbonate radical; and
the organic acid comprising a carboxylate radical; and
the free-radical starter comprises (b1) the at least one aldehyde and/or ketone and the at least one primary amine,
the at least one aldehyde or ketone being of the formula (II),

wherein:
R$_2$, R$_3$ each independently of the other denotes hydrogen or an unsubstituted or substituted organic radical which includes at least one aliphatic, heteroaliphatic, alicyclic or heterocyclic molecular structure; and
the one or more aldehydes and/or ketones are compounds which have at least one or more primary and/or secondary hydrogen atoms at the carbon atom in the α-position to the carbonyl group;
the at least one primary amine comprising one or more of mono-, di- and poly-amines, heteroalkyl- or heteroalkylene-(mono- or di-)amines, amine-functionalised polyoxyalkylenes, cycloalkyl- or cycloalkylene-(mono- or di)amines, heterocycloalkyl- or heterocycloalkylene-(mono- or di-)amines, arylalkyl- or arylalkylene-(mono- or di-)amines, aminosilanised fillers, aminoamides, polyaminoamides, Mannich bases or amine adducts and aminoalkylsilanes;
wherein the constituents aldehyde and/or ketone on the one hand and the constituent primary amine on the other hand are divided separately between two components for mixing when the hardener system is used.

7. The hardener system according to claim 1, wherein the activator in the form of a metal salt comprises one or more salts of organic and/or inorganic acids with metals, and the free-radical starter comprises:
(b1) the at least one aldehyde and/or ketone and the at least one primary amine, wherein:
the at least one aldehyde and/or ketone is a compound which has at least one or more primary and secondary hydrogen atoms at the carbon atom in the α-position to the carbonyl group,
and the at least one primary amine comprises one or more mono-, di- and poly-amines, heteroalkyl- or heteroalkylene-(mono- or di-)amines, amine-functionalised polyoxyalkylenes, cycloalkyl- or cycloalkylene-(mono- or di)amines, heterocycloalkyl- or heterocycloalkylene-(mono- or di-)amines, arylalkyl- or arylalkylene-(mono- or di-)

amines, aminosilanised fillers, aminoamides, polyaminoamides, Mannich bases or amine adducts and aminoalkylsilanes;

wherein the constituents aldehyde and/or ketone on the one hand and the constituent primary amine on the other hand are divided separately between two components and are only provided for mixing when the hardener system is used; or (b2) the imine which includes one or more imine structural increments of the formula (I), the imine obtained by reaction of at least one aldehyde and/or ketone with at least one primary amine, the aldehyde and/or ketone comprising a compound which has at least one or more primary and/or secondary hydrogen atoms at the carbon atom in the α-position to the carbonyl group, and the at least one primary amine comprising one or more of mono-, di- and poly-amines, heteroalkyl- or heteroalkylene-(mono- or di-)amines, amine-functionalised polyoxyalkylenes, cycloalkyl- or cycloalkylene-(mono- or di)amines, heterocycloalkyl- or heterocycloalkylene-(mono- or di-)amines, arylalkyl- or arylalkylene-(mono- or di-)amines, aminosilanised fillers, aminoamides, polyaminoamides, Mannich bases or amine adducts and aminoalkylsilanes; or both the at least one aldehyde and/or ketone and the at least one primary amine as mentioned under (b1) and the imine mentioned under (b2).

8. An initiator system comprising the hardener system according to claim 1 and at least one synthetic resin composition comprising a free-radical-polymerisable compound.

9. The initiator system according to claim 8, wherein the at least one free-radical-polymerisable compound comprises a free-radical-hardening unsaturated reactive resin with at least 2 or more reactive non-aromatic unsaturated bonds, or a mixture of two or more reactive resins.

10. A synthetic resin composition, comprising:
the hardener system according to claim 1, wherein (b2) the imine which includes one or more imine structural increments of the formula (I) comprises at least one ketimine or aldimine; and
at least one free-radical-polymerisable compound comprising a free-radical-hardening unsaturated reactive resin with at least 2 or more reactive non-aromatic unsaturated bonds, or a mixture of two or more reactive resins.

11. The synthetic resin composition according to claim 10, wherein the hardener system comprises (b2) the imine which includes one or more imine structural increments of the formula (I).

12. The synthetic resin composition according to claim 10, wherein the hardener system comprises (b1) the least one aldehyde and/or ketone and the at least one primary amine.

13. The synthetic resin composition according to claim 10, wherein the activator in the form of a metal salt comprises one or more salts of organic and/or inorganic acid with metals, the one or more metals comprising one or more of copper, iron, vanadium, manganese, cerium, cobalt, zirconium, and bismuth, the inorganic acid comprising one or more of a sulfate radical and a carbonate radical; and the organic acid comprising a carboxylate radical; and
the free-radical starter comprises (b2) the imine which includes one or more imine structural increments of the formula (I), the imine comprising at least one aldimine or ketimine, obtained by condensation, with removal of water, of a mono-, di- or poly-amine with one or more aldehydes or ketones, wherein:

the mono-, di- or poly-amine comprises one or more of aminol; alkyl/alkylene(mono- or di-)amine; cycloalkyl/cycloalkylene(mono- or di-)amine; heterocycloalkyl/heterocycloalkylene(mono- or di-)amine; a compound of the formula $H_2N$—$(CH_2)_i$—$NH$—$[(CH_2)_j$—$NH]_k$—$(CH_2)_l$—$NH_2$, wherein i, j and l each independently of the others denotes from 2 to 4 and k denotes 0, 1, 2, 3 or 4; aminoamide; polyaminoamide, Mannich base; amine adduct; and aminoalkylsilane that includes at least one hydrolysable group; and the one or more aldehydes or ketones are of the formula (II),

wherein:
$R_2$, $R_3$ each independently of the other denotes hydrogen or an unsubstituted or substituted organic radical which includes at least one aliphatic, heteroaliphatic, alicyclic, or heterocyclic molecular structure; and
the one or more aldehydes and/or ketones are compounds which have at least one or more primary and/or secondary hydrogen atoms at the carbon atom in the α-position to the carbonyl group.

14. The synthetic resin composition according to claim 10, wherein the activator in the form of a metal salt comprises one or more salts of organic and/or inorganic acid with metals, the one or more metals comprising one or more of copper, iron, vanadium, manganese, cerium, cobalt, zirconium, and bismuth, the inorganic acid comprising one or more of a sulfate radical and a carbonate radical; and the organic acid comprising a carboxylate radical; and
the free-radical starter comprises (b1) the at least one aldehyde and/or ketone and the at least one primary amine,
the at least one aldehyde or ketone being of the formula (II),

wherein:
$R_2$, $R_3$ each independently of the other denotes hydrogen or an unsubstituted or substituted organic radical which includes at least one aliphatic, heteroaliphatic, alicyclic or heterocyclic molecular structure; and
the one or more aldehydes and/or ketones are compounds which have at least one or more primary and/or secondary hydrogen atoms at the carbon atom in the α-position to the carbonyl group; and
the at least one primary amine comprising one or more of mono-, di- and poly-amines, heteroalkyl- or heteroalkylene-(mono- or di-)amines, amine-functionalised polyoxyalkylenes, cycloalkyl- or cycloalkylene-(mono- or di)amines, heterocycloalkyl- or heterocycloalkylene-(mono- or di-)amines, arylalkyl- or arylalkylene-(mono- or di-)amines, aminosilanised fillers, aminoamides, polyaminoamides, Mannich bases or amine adducts and aminoalkylsilanes.

15. The synthetic resin composition according to claim 10 in the form of a multi-component system or kit.

16. An adhesive comprising the synthetic resin composition according to claim 10.

17. A coating material, or moulding composition comprising the synthetic resin composition according to claim 10.

18. A moulding composition comprising the synthetic resin composition according to claim 10.

19. A method of fixing of an anchoring elements in a hole or crevice in a substrate, comprising:
   providing the synthetic resin composition according to claim 10 together with the anchoring elements in the hole or crevice.

20. A method of reinforcing a structure, comprising:
   providing the synthetic resin composition according to claim 10 together with one or more of fibres, non-crimp fabrics, woven fabrics or composites; and
   fixing the one or more of fibres, non-crimp fabrics, woven fabrics or composites to the structure using the synthetic resin composition.

21. The hardener system according to claim 2, wherein the at least one activator in the form of a metal salt comprises a copper salt of organic or inorganic acid.

22. The hardener system according to claim 2, wherein the at least one activator in the form of a metal salt comprises a copper carboxylate, copper sulfate or copper chloride.

* * * * *